(12) United States Patent
Itoh et al.

(10) Patent No.: US 9,944,468 B2
(45) Date of Patent: Apr. 17, 2018

(54) CONVEYOR DEVICE

(71) Applicant: ITOH DENKI CO., LTD., Kasai-shi, Hyogo (JP)

(72) Inventors: Kazuo Itoh, Kasai (JP); Tatsuhiko Nakamura, Hyogo (JP); Tomohiro Takami, Kasai (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 15/306,155

(22) PCT Filed: Apr. 28, 2015

(86) PCT No.: PCT/JP2015/062806
§ 371 (c)(1),
(2) Date: Oct. 24, 2016

(87) PCT Pub. No.: WO2015/166943
PCT Pub. Date: Nov. 5, 2015

(65) Prior Publication Data
US 2017/0050807 A1  Feb. 23, 2017

(30) Foreign Application Priority Data

Apr. 30, 2014 (JP) ................................. 2014-093919

(51) Int. Cl.
*B65G 29/00* (2006.01)
*B65G 47/52* (2006.01)
(Continued)

(52) U.S. Cl.
CPC ............. *B65G 29/00* (2013.01); *B65G 13/00* (2013.01); *B65G 47/52* (2013.01); *B65G 47/80* (2013.01)

(58) Field of Classification Search
CPC ........ B65G 29/02; B65G 29/00; B65G 47/80; B65G 47/52; B65G 47/53; B65G 47/54; B65G 15/02; B65G 15/08
See application file for complete search history.

(56) References Cited

U.S. PATENT DOCUMENTS 2,580,054 A * 12/1951 Vincent .................. B65G 37/00
198/457.05
3,085,671 A * 4/1963 Pixley .................... B65G 47/80
198/434

(Continued)

FOREIGN PATENT DOCUMENTS

DE     26 11 354 A1    9/1977
JP     S50 31577 A     3/1975
(Continued)

OTHER PUBLICATIONS

International Search Report, dated Jul. 14, 2015, in International Application No. PCT/JP2015/062806.
(Continued)

*Primary Examiner* — Mark A Deuble
(74) *Attorney, Agent, or Firm* — Wood, Phillips, Katz, Clark & Mortimer

(57) ABSTRACT

An object is to improve a conveyor device including a curved passage and to provide a conveyor device that enables the curvature radius of a curved passage to be reduced. A conveyor device (1) includes an introducing side linear conveyor (2), a curved passage conveyor (3), and a discharging side linear conveyor (5). The curved passage conveyor (3) conveys an object with a rotation trajectory of approximately 180°. The curved passage conveyor (3) includes a circular plate (6), and the upper face of the circular plate (6) functions as a conveying surface. The circular plate (6) is curved or bent. A part of the circular plate (6) other than the curved passage conveyor (3) gets under the (Continued)

conveying surfaces of the introducing side linear conveyor (2) and the discharging side linear conveyor (5).

20 Claims, 13 Drawing Sheets

(51) Int. Cl.
*B65G 47/80* (2006.01)
*B65G 13/00* (2006.01)

(56) References Cited

U.S. PATENT DOCUMENTS

| | | | | |
|---|---|---|---|---|
| 3,838,767 A | * | 10/1974 | Taylor | B65G 15/02 198/815 |
| 3,854,575 A | * | 12/1974 | Fraioli, Sr. | B65G 15/02 198/831 |
| 4,180,158 A | * | 12/1979 | Frederick | A47F 9/04 186/67 |
| 4,496,110 A | * | 1/1985 | Raasch | B65H 67/061 198/457.05 |
| 5,372,236 A | * | 12/1994 | Layer | B65G 29/00 198/392 |
| 5,439,098 A | * | 8/1995 | Bonnet | B65G 15/02 198/831 |
| 5,984,084 A | * | 11/1999 | Osaka | B65G 15/02 198/831 |
| 7,441,648 B1 | * | 10/2008 | Kitazumi | B65G 15/02 198/465.3 |
| 7,784,600 B2 | | 8/2010 | Weber | |
| 2004/0118662 A1 | * | 6/2004 | Shiotani | B65G 15/02 198/831 |
| 2005/0082146 A1 | * | 4/2005 | Axmann | B65G 15/02 198/831 |
| 2005/0199474 A1 | * | 9/2005 | Axmann | B65G 15/02 198/831 |

FOREIGN PATENT DOCUMENTS

| | | | |
|---|---|---|---|
| JP | 61140411 A | * | 6/1986 |
| JP | 61-145027 A | | 7/1986 |
| JP | 62-46980 | | 3/1987 |
| JP | 08-258961 A | | 10/1996 |
| JP | 2005-119776 A | | 5/2005 |
| JP | 2010-047346 A | | 3/2010 |
| JP | 2011-037576 A | | 2/2011 |

OTHER PUBLICATIONS

International Preliminary Report on Patentability and Written Opinion, dated Nov. 1, 2016, in Appln. No. PCT/JP2015/062806.
Supplementary European Search Report, dated Nov. 24, 2017, in European Patent Application No. EP 15 78 6196.

* cited by examiner

CONVEYOR DEVICE

TECHNICAL FIELD

The present invention relates to a conveyor device, and more particularly, to a conveyor device that includes a curved passage part.

BACKGROUND ART

A conveyor line is often laid in an assembly line of products or a delivery center of goods. A layout of a conveyor line partially including a curved passage part may be employed.

Conveyor devices including a curved passage part are disclosed, for example, in Patent Documents 1, 2. FIG. 14 is a plan view of a conveyor device 100 disclosed in Patent Document 1. The conventional conveyor device 100 includes two frames 101, 102 which are concentrically bent, and a plurality of conveying rollers 103 are disposed between the two frames 101, 102.

Each of the conveying rollers 103 has a conical outer shape. Any of the conveying rollers is a motor-incorporating roller which incorporates a motor therein and rotates with the incorporated motor. The other conveying rollers 103 are idling rollers. In the conveyor device 100, a belt 105 is wound around each adjacent conveying rollers 103, so that all the conveying rollers 103 rotate in an interlocked manner.

Thus, all the conveying rollers are rotated by applying power to the motor inside the motor-incorporating roller to rotate the motor-incorporating roller, which enables an object to be conveyed. The conveying trajectory of the object forms a circular arc, and the traveling direction is changed by 90°.

Patent Document 2 discloses a conveyor device capable of changing the traveling direction by approximately 180°.

PRIOR ART DOCUMENTS

Patent Documents

Patent Document 1: JP 2011-37576 A
Patent Document 2: JP 4274362 B2

DISCLOSURE OF INVENTION

Technical Problem

The conveyor devices disclosed in Patent Documents 1, 2 make it possible to change the conveying direction of an object along a curved trajectory.

However, in the conveyor devices disclosed in Patent Documents 1, 2, disadvantageously, the curvature radius of the conveying passage is large, and the entire shape is thus large.

That is, in the conventional conveyor device 100, a conveying passage 106 is largely away from a center point 107 of the curve of the curved passage. Specifically, in the conventional conveyor device 100, as illustrated in FIG. 14, there is no conveying surface in a region within a radius r from the center point 107 of the curve. Thus, the curvature radius R of a center line 108 of the conveying passage 106 is large as illustrated in FIG. 14.

In the conveyor device which changes the traveling direction by approximately 180° like the conveyor device of Patent Document 2, a large gap is formed between conveyor devices in a linear part. The gap is a wasted space that is difficult to effectively use.

Thus, in view of the above conventional problems, the present invention improves a conveyor device including a curved passage and provides a conveyor device that enables the curvature radius of a curved passage to be reduced.

Solution to Problem

An aspect for solving the above problems is a conveyor device including: a curved passage part; an object introducing part that introduces an object into the curved passage part; an object discharging part that discharges the object from the curved passage part; a plate body planarly rotating around a curvature center of the curved passage part or the vicinity of the curvature center; and a rotating unit for rotating the plate body, wherein a surface of the plate body is exposed in a rotation region from the object introducing part to the object discharging part, and wherein the surface of the plate body gets under a different member in a rotation region from the object discharging pail through the object introducing part.

In the conveyor device of this aspect, the plate body planarly rotates around the curvature center of the curved passage part or the vicinity thereof. Thus, a mechanism that supports both ends of the conveying roller is not required differently from the conventional curved passage conveyor. Thus, the structure of the inner peripheral side of the curved passage part can be simplified. Thus, the object introducing part and the object discharging part can be disposed close to each other. That is, the object introducing part and the object discharging part can be configured within the rotation radius of the plate body. Thus, the object introducing part and the object discharging part can be disposed close to each other. Accordingly, in the conveyor device of this aspect, the course of an object can be changed within the minimum rotation radius. Further, the conveyor device can be downsized, and the space saving can be achieved.

In the conveyor device of this aspect, the surface of the plate body is exposed in the rotation region from the object introducing part through the object discharging part. Thus, the plate body can constitute the conveying surface of the curved passage part.

In the conveyor device of this aspect, the surface of the plate body gets under an other member in the rotation region from the object discharging part through the object introducing part. Thus, the conveyor device can be downsized.

Further, in the conveyor device of this aspect, in an object moved from the object introducing part to the object discharging part through the curved passage part, the course thereof has been changed, but the front-rear direction with respect to the traveling direction has not been changed. Thus, the object can be easily handled.

Another aspect for solving the same problems is a conveyor device including: a curved passage part; a plate body; and a rotating unit for rotating the plate body, wherein a part of the plate body is located in the curved passage part to constitute a conveying surface of the curved passage part, wherein the rest part of the plate body located at a position other than the curved passage part is shielded by a different member, and wherein the curved passage part includes: an object introducing part where the rotating plate body appears in the curved passage part from a position shielded by the different member; and an object discharging part where the rotating plate body is housed into the position shielded by the different member from the curved passage part.

In the conveyor device of this aspect, the rotating plate body constitutes the conveying surface of the curved passage part. Thus, a mechanism that supports both ends of the conveying roller is not required differently from the conventional curved passage conveyor. Thus, the structure of the inner peripheral side of the curved passage part can be simplified.

Further, the object introducing part and the object discharging part can be configured within the rotation radius of the plate body. Thus, the object introducing part and the object discharging part can be disposed close to each other. Accordingly, in the conveyor device of this aspect, the course of an object can be changed within the minimum rotation radius. Further, the conveyor device can be downsized, and the space saving can be achieved.

Further, a part of the plate body rotated by the rotating unit is located in the curved passage part to constitute the conveying surface of the curved passage part. Thus, the conveying surface of the curved passage part is continuous and capable of placing even a small object thereon to be conveyed.

Further, for an object moved from the object introducing part to the object discharging part through the curved passage part, the course thereof has been changed, but the front-rear relation with respect to the traveling direction has not been changed. Thus, the object can be easily handled.

Desirably, the plate body is elastically deformable, and a part of the plate body shielded by the other member is tilted with respect to the part located in the curved passage part and gets under the other member.

Desirably, a part of the plate body located at a position other than the curved passage part is shielded by a different member, the plate body being elastically deformable, and a part shielded by the different member is tilted with respect to a part located in the curved passage part and gets under the different member.

In the conveyor device of this aspect, the plate body is elastically deformed so that the plate body can constitute the conveying surface in the curved passage part and can easily get under another member at the position other than the curved passage part.

Desirably, the conveyor device further includes a pressing member that presses the plate body along a straight line parallel to the object introducing part and/or the object discharging part, the straight line not passing through a center of the plate body.

In the conveyor device of this aspect, the plate body is pressed by the pressing member along the straight line that is parallel to the object introducing part and/or the object discharging part and does not pass through the center of the plate body. Thus, the plate body is curved or bent parallel to the straight line. That is, the rotating plate body is easily curved or bent and gets under another member.

Desirably, the curved passage part includes a plurality of holding members that hold a front face or a rear face of the plate body and that are disposed at a plurality of positions.

In the conveyor device of this aspect, the position of the plate body is stabilized, and the conveying surface of the curved passage part is stabilized.

Desirably, each of the object introducing part and the object discharging part is provided with a linear conveyor, the two linear conveyors being parallel to each other, each of the linear conveyors conveying the object by a rotation body or a traveling body.

In the conveyor device of this aspect, the object introducing part includes the linear conveyor, the object discharging part includes the linear conveyor, and the two linear conveyors are parallel to each other. Thus, an interval between the linear conveyors is narrow, and a wasted space is small. Further, each of the linear conveyors conveys an object by the rotation body or the traveling body. Thus, the object can be smoothly conveyed.

Desirably, both ends of the curved passage part face substantially the same direction.

The conveyor device of this aspect includes a curved passage of approximately 180°. Thus, the ends of the curved part face substantially the same direction. Accordingly, the object introducing part and the object discharging part are closed to each other. Thus, space saving can be achieved in the conveyor device.

Desirably, an interval between the linear conveyors is 20% or less of a width of each of the linear conveyors.

The conveyor device of this aspect has a small wasted space.

Desirably, the conveyor device further includes a motor-incorporating roller and a follower roller that hold a front face or a rear face of the plate body.

In this aspect, the front and rear faces of the plate body are held between the motor-incorporating roller and the follower roller. Thus, when the motor-incorporating roller is driven, the plate body smoothly rotate while being pressed by the motor-incorporating roller and the follower roller. Thus, an object can be smoothly conveyed.

Desirably, the conveyor device further includes a tilted position holding guide that presses at least a front face of the plate body to force a part of the plate body in a tilted position.

According to this aspect, when the plate body rotates, a part of the plate body is sequentially changed into to a tilted position and gets under another member.

Desirably, the conveyor device further includes a horizontal position holding guide that holds a front face or a rear face of the plate body to hold a part of the plate body in a substantially horizontal position.

According to this aspect, a part of the plate body is maintained in a substantially horizontal position when the plate body rotates. Thus, an object does not move up and down.

Desirably, the tilted position holding guide includes a freely-rotatable short roller.

Desirably, the conveyor device further includes a load supporting member that is disposed on a rear face of the plate body in a region constituting the curved passage part, the load supporting member supporting the rear face of the plate body to indirectly support weight of the object placed on the plate body.

Effect of Invention

In the conveyor device of the present invention, the curvature radius of the curved passage part is small, and a wasted space on the layout is small.

BRIEF DESCRIPTION OF DRAWINGS

FIGS. 13A and 13B are explanatory diagrams conceptually representing the relationship between the plate body and the members in contact with the plate body, wherein FIG. 13A illustrates a state taken along line A-A of FIG. 12, and FIG. 13B illustrates a state taken along line B-B of FIG. 12.

BEST MODE FOR CARRYING OUT THE INVENTION

Figure 1:
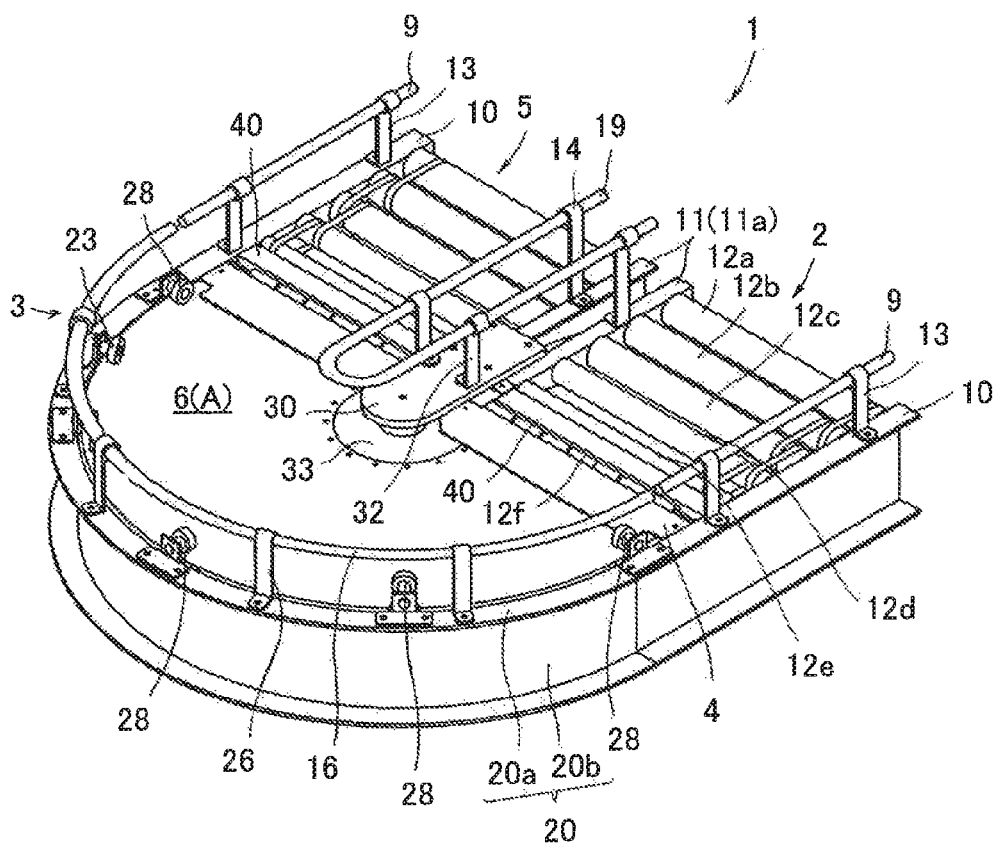
FIG. 1 is a perspective view of a conveyor device of an embodiment of the present invention.

Hereinbelow, an embodiment of the present invention will further be described.

First, the outline of a conveyor device 1 will be described with reference to FIGS. 4, and 10 to 13.

The conveyor device 1 of the present embodiment includes an introducing side linear conveyor 2 (other member), a curved passage conveyor 3, and a discharging side linear conveyor 5 (other member).

As illustrated in FIGS. 4, and 10 to 13, the curved passage conveyor 3 includes, as a principal component, a circular plate 6 (plate body) which is made of a thin metal plate. The circular plate 6 (plate body) has a thickness that is extremely thinner than the diameter thereof. Thus, the circular plate 6 is easily bent.

Figure 10:
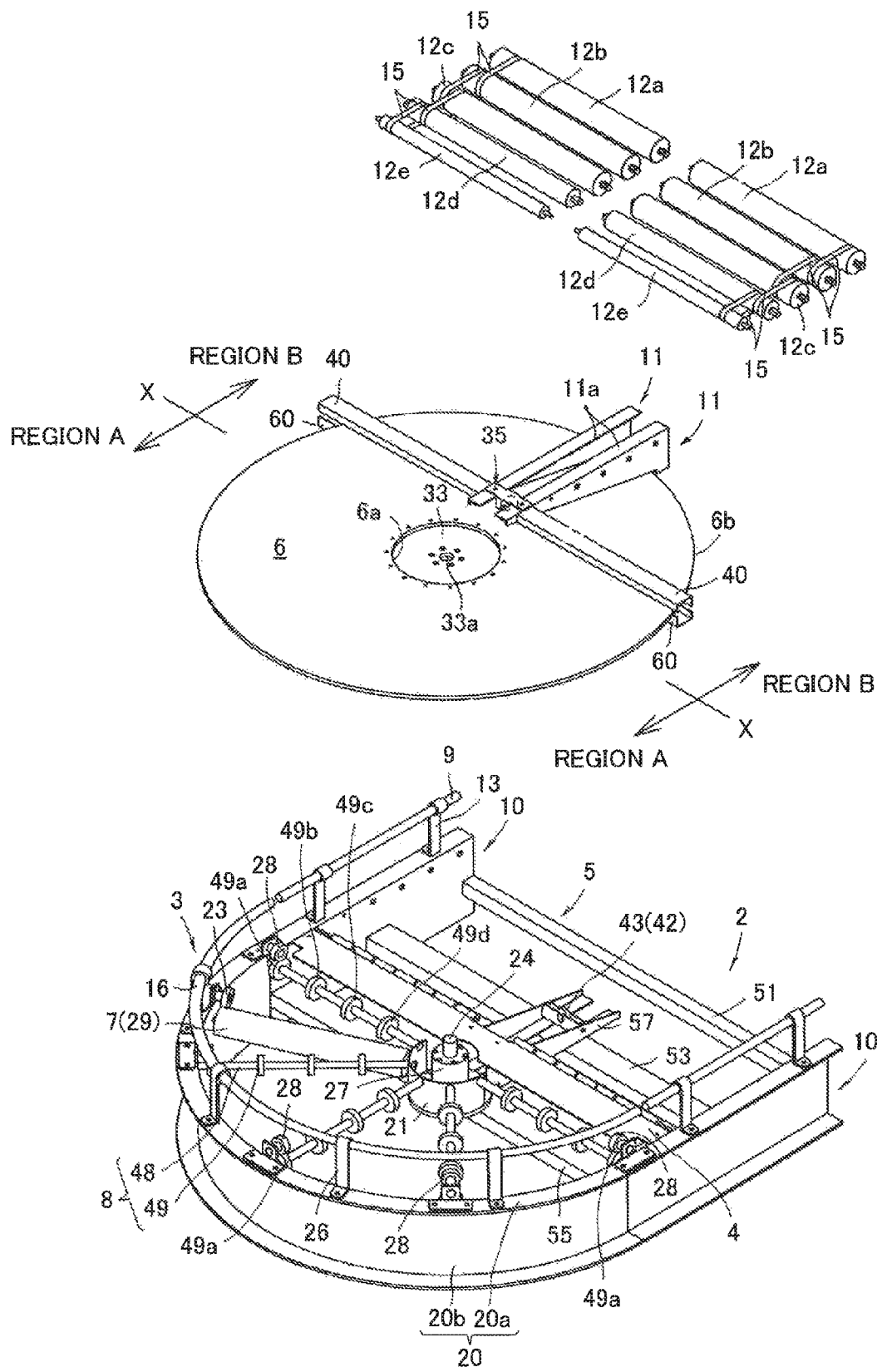
FIG. 10 is an exploded perspective view of the conveyor device of FIG. 1 more correctly illustrating the positional relationship between members.
Figure 11:
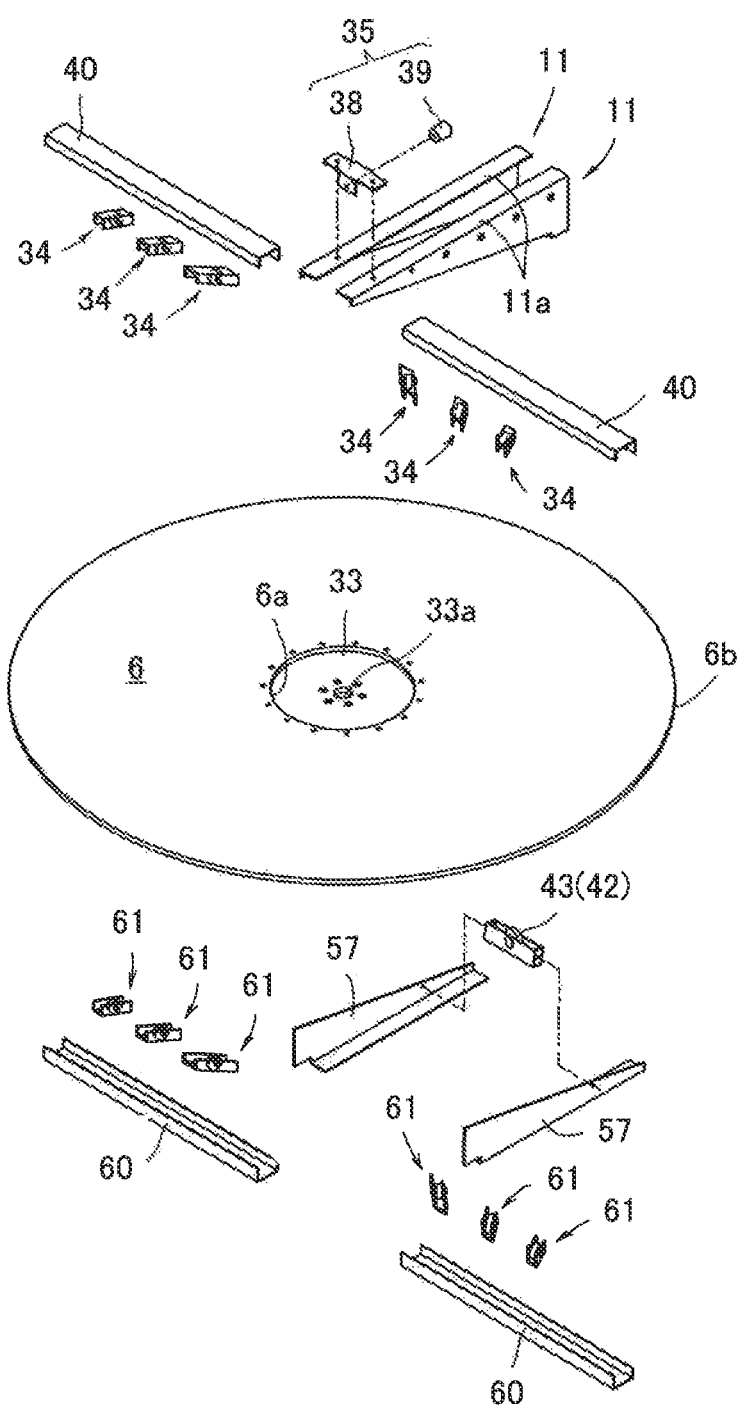
FIG. 11 is an exploded perspective view illustrating the relationship between a plate body of FIG. 10 and pressing members and receiving members.

The circular plate 6 is freely rotatably supported by a shaft 24 illustrated in FIGS. 10 and 13. A roller body of a motor-incorporating roller 7 is in contact with the rear face of the circular plate 6. The circular plate 6 rotates around the shaft 24 under power received from the motor-incorporating roller 7.

Figure 4:
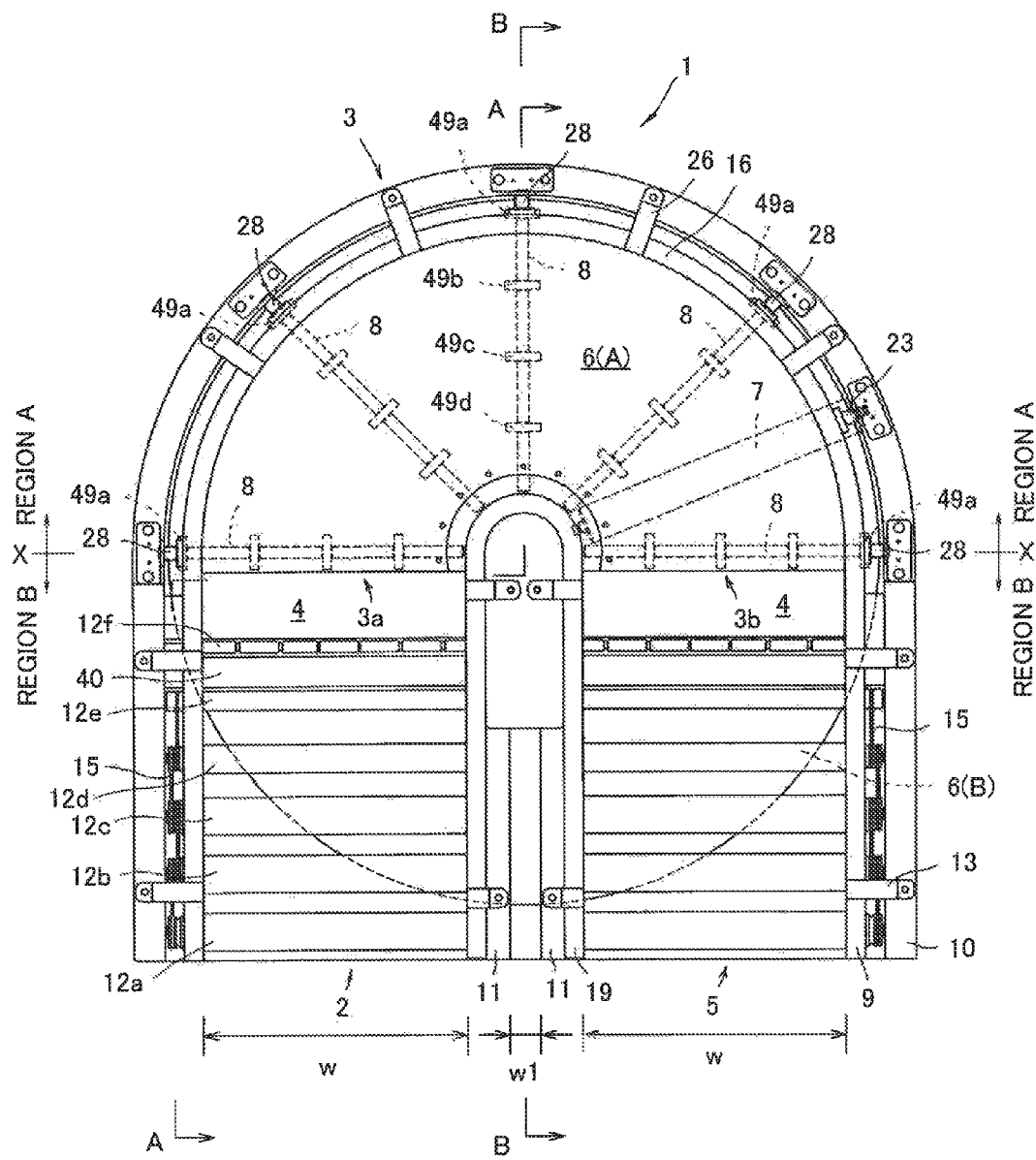
FIG. 4 is a plan view of the conveyor device of FIG. 1.
Figure 12:
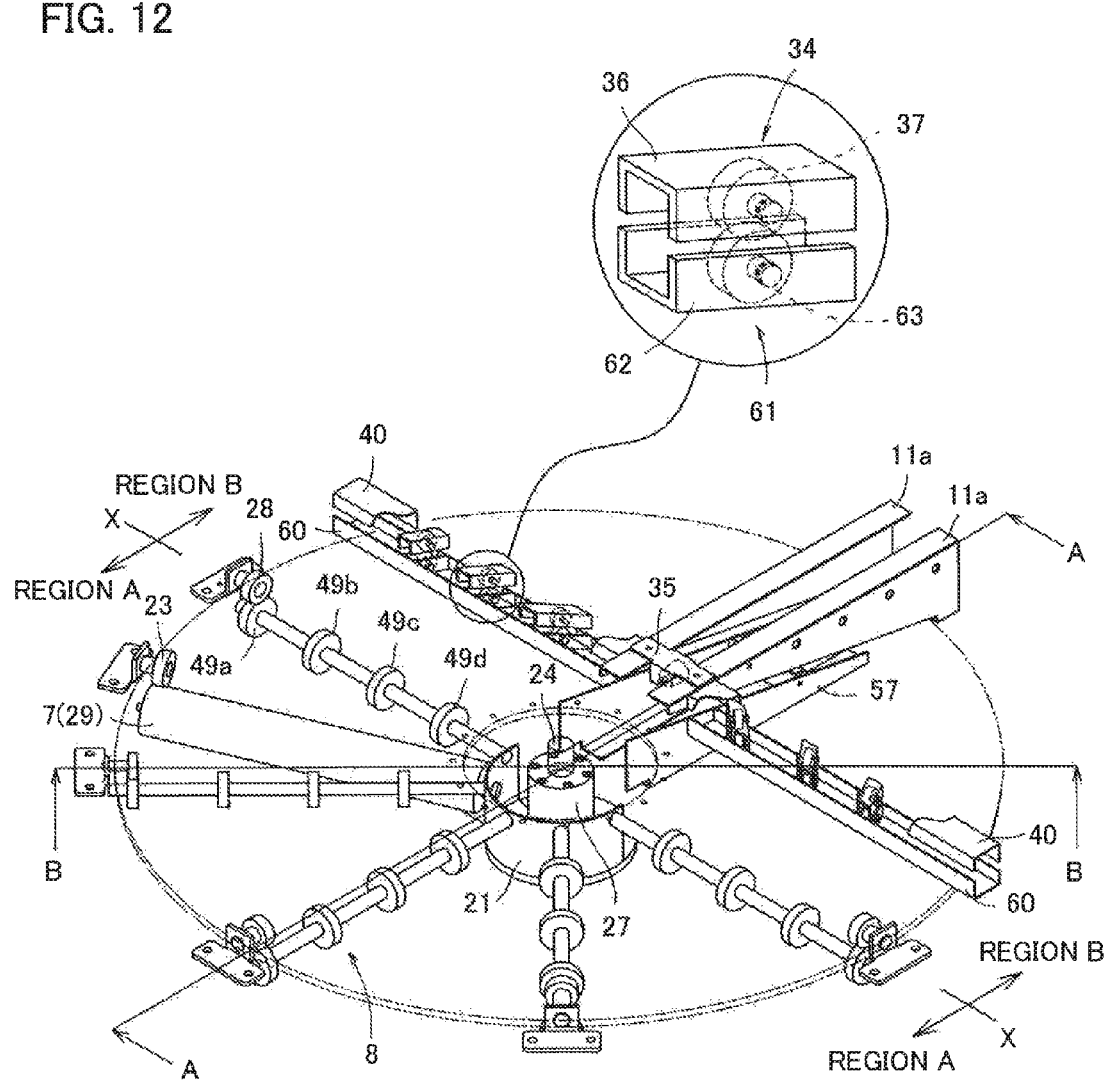
FIG. 12 is a perspective view illustrating the relationship between the plate body of FIG. 10 and members in contact with the plate body.

In a rotating state and a stationary state, as illustrated in FIGS. 4, 12 and 13, the circular plate 6 is divided into a semicircular region A which places an object thereon and a region B which gets under another member in plan view or side view. That is, in plan view, the region B is located at the side corresponding to the introducing side linear conveyor 2 and the discharging side linear conveyor 5 and the region A is located at the other side thereof across a boundary line X-X (FIGS. 4 and 12) which passes through the shaft 24.

As illustrated in FIGS. 10, 12 and 13, the rear face of the region A is supported by short rollers 49a to 49d each of which is a load supporting member. Thus, the region A is capable of tolerating the load of an object placed on the region A to maintain a horizontal position.

As illustrated in FIGS. 12 and 13, a guide roller 28 is disposed on the front face side of the peripheral part of the region A to support the peripheral part of the region A so as not to rise up.

On the other hand, in the region B, the front face of the circular plate 6 is pressed by a tilted position holding guide so that the entire region B is forced to tilt.

Figure 13A:
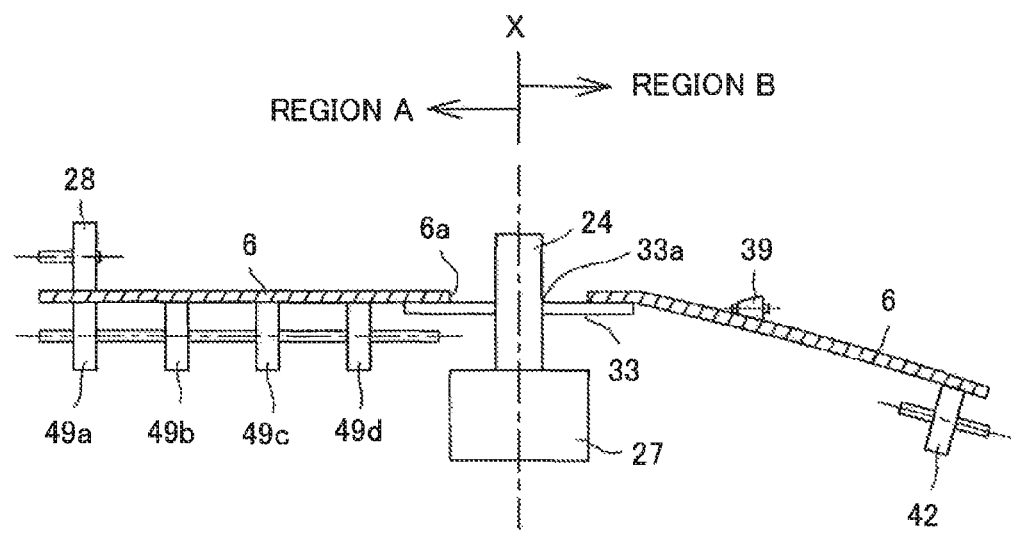
Figure 13B:
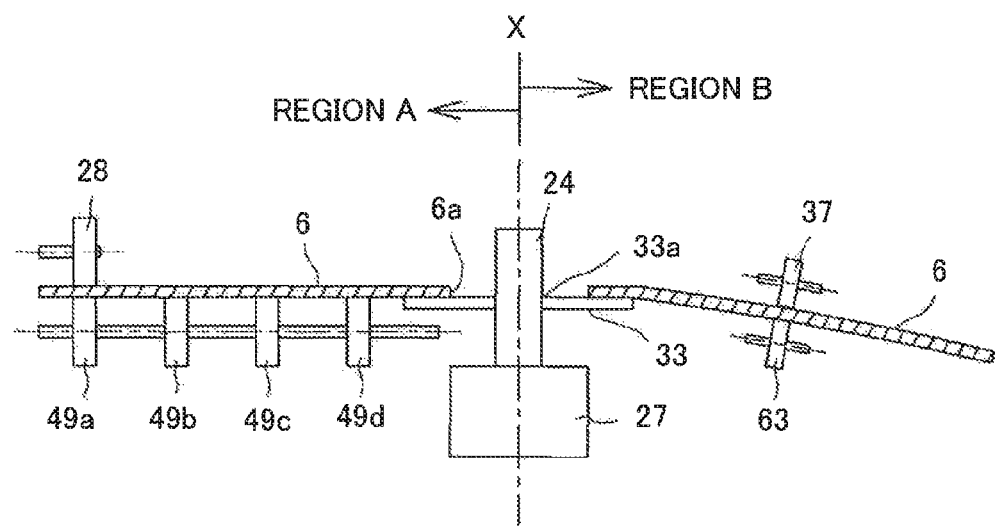
Figure 14:
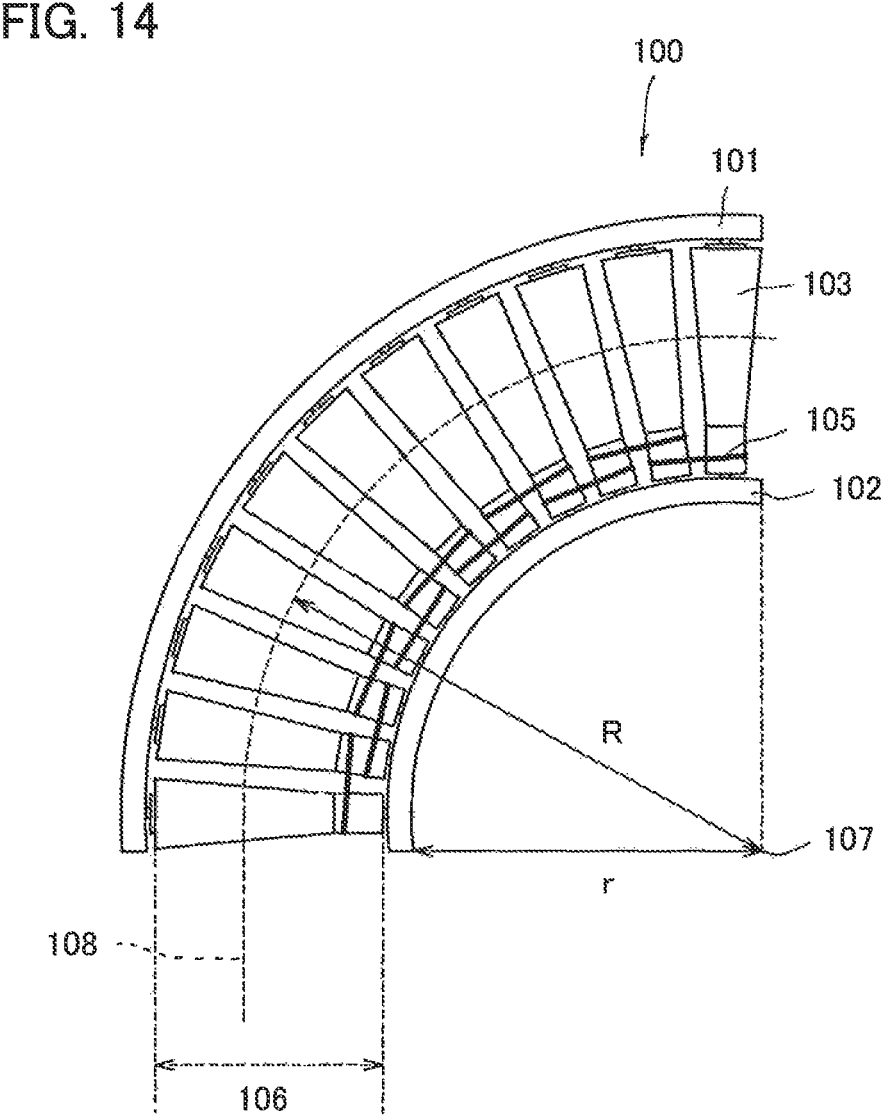
FIG. 14 is a plan view of a conventional conveyor device.

In the present embodiment, the tilted position holding guide includes a presser roller 37 illustrated in FIGS. 12 and 13B and a presser roller 39 illustrated in FIGS. 12 and 13A.

As illustrated in FIG. 4, the introducing side linear conveyor 2 (other member) and the discharging side linear conveyor 5 (other member) are located above the region B of the circular plate 6.

As described above, the circular plate 6 planarly rotates around the shaft 24 by the motor-incorporating roller 7 like a phonograph record.

The rotation direction of the circular plate 6 is in the order of the lower side of the introducing side linear conveyor 2 (other member) (region B), the region A, and the lower side of the discharging side linear conveyor 5 (region B).

Description will be made on a specific part of the circular plate 6. When a specific part of the circular plate 6 is located in the region A, the part is exposed to the outside and maintained in a horizontal position.

When the specific part has reached a position near the discharging side linear conveyor 5 by the progress of rotation, the front face side of the circular plate 6 is pressed by the presser rollers 37, 39 as the tilted position holding guide so that the circular plate 6 is brought into a tilted position. At this time, the specific part gets under the discharging side linear conveyor 5 so as to be shielded by the discharging side linear conveyor 5.

As the rotation further progresses, the specific part moves from the discharging side linear conveyor 5 toward the introducing side linear conveyor 2. Also in this case, the specific part gets under the introducing side linear conveyor 2 so as to be kept shielded by the introducing side linear conveyor 2.

As the rotation further progresses, the specific part appears in the region A from the introducing side linear conveyor 2 so as to be exposed.

An object is conveyed from the introducing side linear conveyor 2 to the region of the circular plate 6 so as to be transferred from the introducing side linear conveyor 2 to the circular plate 6. Since the circular plate 6 is rotating, the object placed on the circular plate 6 moves along a rotation trajectory and reaches the discharging side linear conveyor 5. Then, the object is transferred from the circular plate 6 to the discharging side linear conveyor 5.

Next, the details of the conveyor device 1 of the present embodiment will be described.

The conveyor device 1 of the present embodiment includes the introducing side linear conveyor 2 (other member), the curved passage conveyor 3, and the discharging side linear conveyor 5 (other member). The introducing side linear conveyor 2 and the discharging side linear conveyor 5 have the same structure except a right-left difference.

The introducing side linear conveyor 2 and the discharging side linear conveyor 5 are disposed parallel to each other. Further, the introducing side linear conveyor 2 and the discharging side linear conveyor 5 are close to each other.

The introducing side linear conveyor 2 and the discharging side linear conveyor 5 are both formed inside a pair of outer linear frames 10. In the present embodiment, a pair of inner linear frames 11 is disposed inside the pair of outer linear frames 10.

The outer linear frame 10 located at the side corresponding to the introducing side linear conveyor 2 and the outer linear frame 10 located at the side corresponding to the discharging side linear conveyor 5 are disposed parallel to each other. The outer linear frame 10 located at the side corresponding to the introducing side linear conveyor 2 and the outer linear frame 10 located at the side corresponding to the discharging side linear conveyor 5 are coupled to each other through three parallel connecting members 51, 53, 55 illustrated in FIG. 2. Each of the connecting members 51, 53, 55 connects the outer linear frames 10 near the lower side of each of the outer linear frames 10 close to a floor surface.

In the three connecting members, the connecting member 51 is farthest to the curved passage conveyor 3, and the connecting member 55 is nearest to the curved passage conveyor 3.

The outer linear frame 10 is made of, for example, a light-weight C-shaped steel or a channel steel and includes upper and lower flanges. An outer guide 9 is fixed to the upper flange through a supporting member 13, and the lower flange is fixed to the floor surface. The outer guide 9 is made of a pipe member or a bar member.

The two inner linear frames 11 are closely disposed parallel to each other at a certain interval W1 (FIG. 4) near the center between the outer linear frames 10. The opposed two pairs of outer linear frames 10 and inner linear frames 11 constitute outer frames of the introducing side linear conveyor 2 and the discharging side linear conveyor 5. The outer linear frame 10 of the introducing side linear conveyor 2 and one of the inner linear frames 11 are disposed parallel to each other at a certain interval W (FIG. 4). The outer linear frame 10 of the discharging side linear conveyor 5 and the other inner linear frame 11 are also disposed parallel to each other at the certain interval W.

The inner linear frame 11 of the introducing side linear conveyor 2 and the inner linear frame 11 of the discharging side linear conveyor 5 are close to each other. The interval W1 (FIG. 4) between the inner linear frames 11 is 20% or less of the interval W (FIG. 4) between the outer linear frame 10 and the inner linear frame 11. More preferably, the interval W1 is 10% or less of the interval W.

Figure 2:
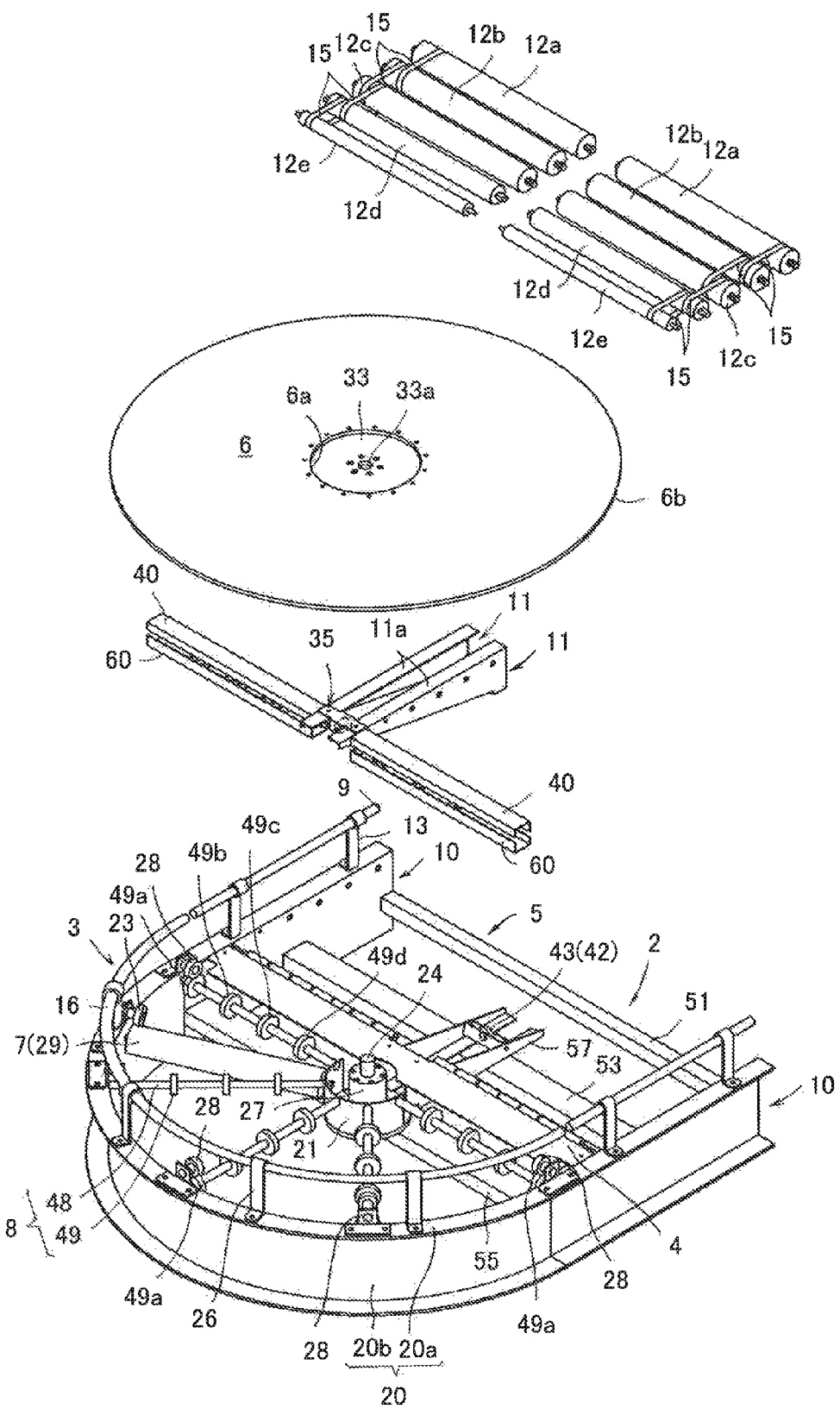
FIG. 2 is an exploded perspective view of the conveyor device of FIG. 1.
Figure 5:
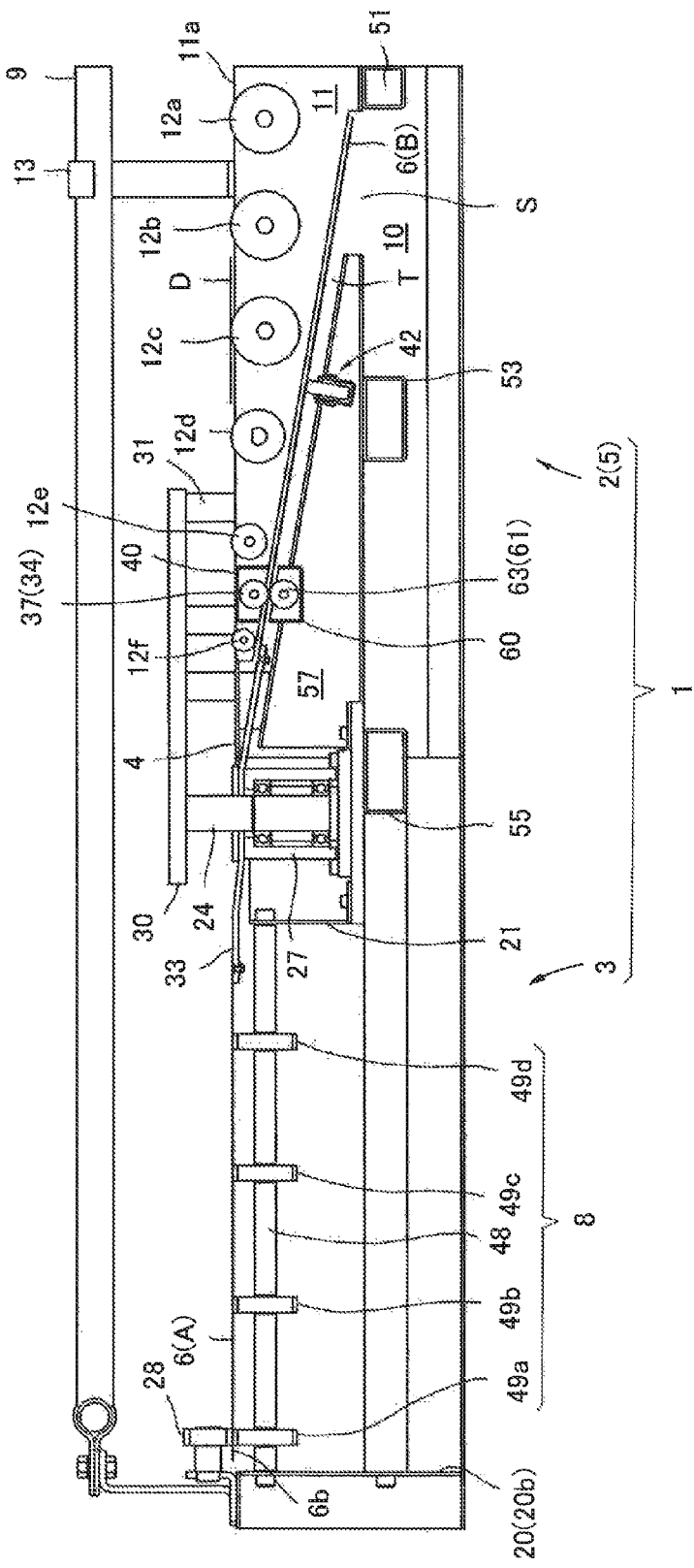
FIG. 5 is a view from the arrow direction A-A of FIG. 4.

The inner linear frame 11 is made of a light-weight C-shaped steel or a channel steel similarly to the outer linear frame 10. As illustrated in FIGS. 2 and 5, the lower face side of the inner linear frame 11 is obliquely cut off. Thus, the inner linear frame 11 has a substantially triangular side shape as illustrated in FIG. 2. That is, the upper side of the inner linear frame 11 is horizontal, and the lower side thereof is inclined so as to come close to the upper side toward the curved passage conveyor 3. In other words, the height-direction dimension of the inner linear frame 11 becomes smaller toward the curved passage conveyor 3, so that a space S (FIG. 5) is formed under the inner linear frame 11.

An end of the inner linear frame 11 located at the side opposite to the curved passage conveyor 3 is fixed to the connecting member 51. An end of the inner linear frame 11 located at the side facing the curved passage conveyor 3 is fixed to a connecting member (not illustrated) which connects the outer linear frames 10 on the upper side thereof.

A flange 11a is formed on the upper part of the inner linear frame 11. As illustrated in FIG. 1, a U-shaped inner guide 19 is fixed to the flange 11a through a supporting member 14. The inner guide 19 is made of a pipe member or a bar member similarly to the outer guide 9.

Figure 3:
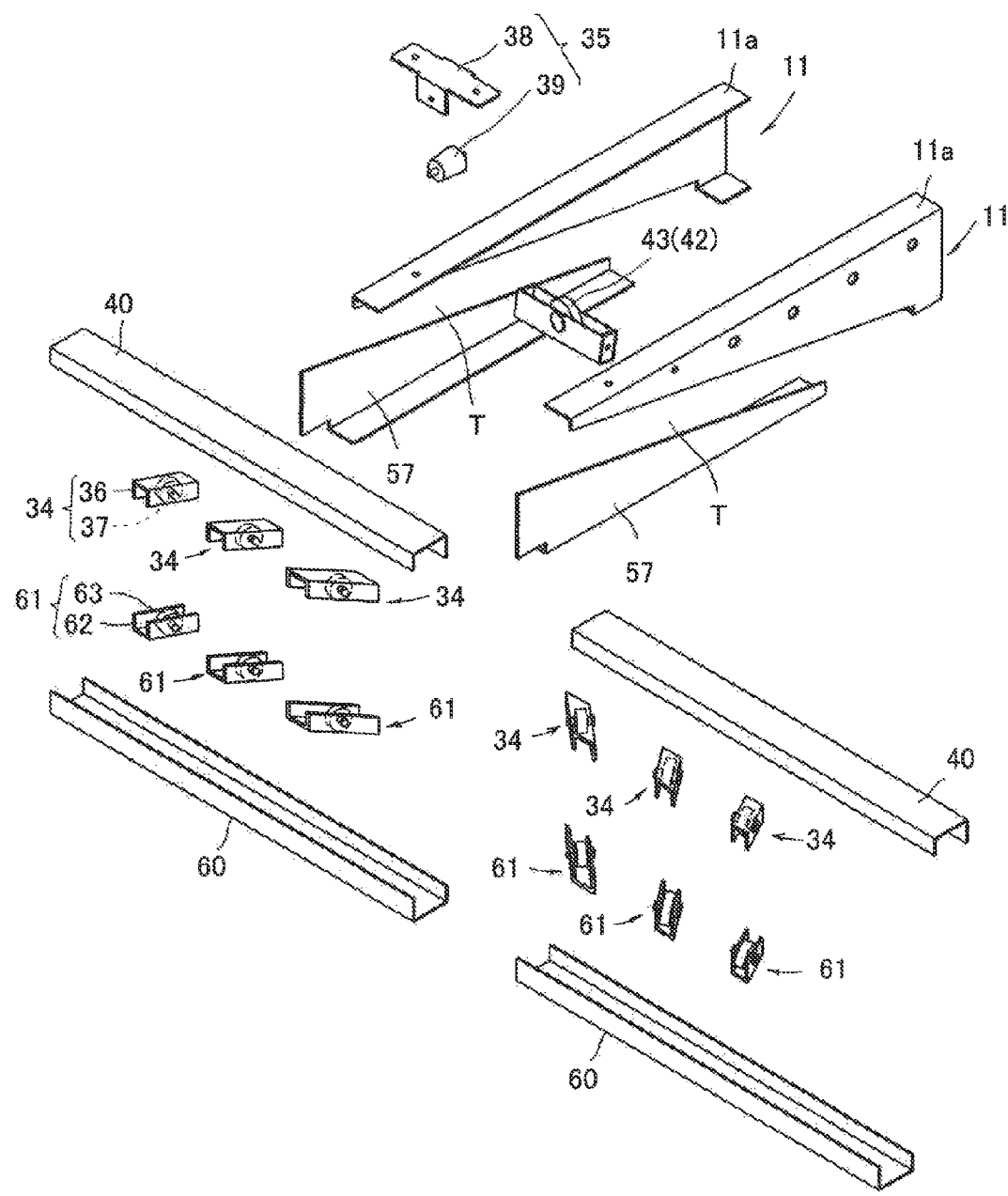
FIG. 3 is an exploded perspective view of presser members and members around the presser members of the conveyor device of FIG. 1.
Figure 6:
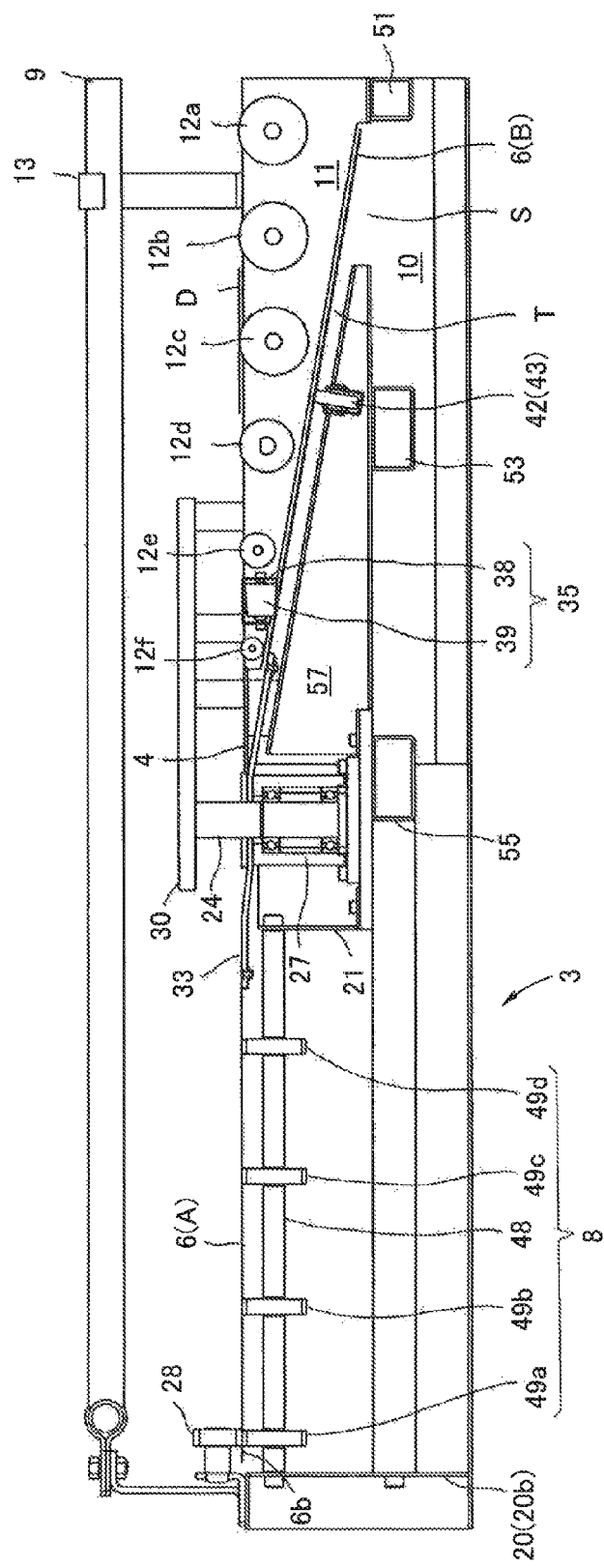
FIG. 6 is a view from the arrow direction B-B of FIG. 4.

A presser member 35 (FIGS. 2, 3, 6, 11 and 12) is fixed to the flange 11a of each of the inner linear frames 11. That is, the presser member 35 extends across both the inner linear frames 11. The presser member 35 includes a casing 38 and the presser roller 39 (FIGS. 3 and 6). The presser roller 39 is a taper roller and rotatably fixed to the casing 38. The casing 38 is fixed to each of the flanges 11a (FIG. 2) of the two inner linear frames 11 which are close to each other. The shaft (the rotation center of the circular plate 6) 24 is present on the extension of a rotation axis of the presser roller 39. The small-diameter side of the presser roller 39 faces the shaft 24.

A plurality of conveying rollers 12a to 12f (FIG. 4) are disposed between the outer linear frame 10 and the inner linear frame 11.

In the present embodiment, the six conveying rollers 12a to 12f are provided. In the six conveying rollers 12a to 12f, the conveying roller 12c on the center is a motor-incorporating roller, and the other conveying rollers 12a, 12b, 12d, 12e, and 12f are idling rollers. The motor-incorporating roller includes a motor and a speed reducer which are incorporated in a roller body. The roller body is rotated by applying power to the motor inside the roller body.

The conveying roller 12d has a smaller diameter than the conveying rollers 12a to 12c. The conveying roller 12e has a smaller diameter than the conveying roller 12d. The conveying roller 12f has a smaller diameter than the conveying roller 12e. The conveying rollers 12a to 12f have the same height at their uppermost parts. The upper most parts of the conveying rollers 12a to 12f constitute a conveying surface D (FIG. 5).

In the present embodiment, the heights of the lower faces of the conveying rollers 12a to 12c become higher toward the region A.

Thus, a space which is inclined when viewed from the side face is present under the introducing side linear conveyor 2 and the discharging side linear conveyor 5.

In the present embodiment, a belt 15 (FIGS. 2 and 4) is wound around each adjacent conveying rollers 12, so that all the conveying rollers 12 rotate in an interlocked manner. Thus, all the conveying rollers 12 coupled through the belts 15 are rotated by applying power to the motor (not illustrated) of the motor-incorporating roller 12c to rotate the motor-incorporating roller 12c (conveying roller 12c), which enables an object 50 (FIG. 7) to be linearly conveyed.

The introducing side linear conveyor 2 includes a shielding plate 4 (FIGS. 4 and 5) which is disposed at the side closer to the end (the region A, the curved passage conveyor 3) than the conveying roller 12f is. The shielding plate 4 is a plate-like member which is disposed at a height substantially equal to the conveying surface D (FIG. 5). The object 50 conveyed by the conveying rollers 12a to 12f slides on the shielding plate 4 and moves to the curved passage conveyor 3 on the downstream side.

A supporting member 40 which extends parallel to the conveying rollers 12e, 12f is disposed between the conveying rollers 12e, 12f of the introducing side linear conveyor 2. Both ends of the supporting member 40 are fixed to the outer linear frame 10 and the inner linear frame 11. A presser member 34 (pressing member) is fixed to the lower face side of the supporting member 40. As illustrated in FIG. 3, the presser member 34 includes a casing 36 and the presser roller 37. The presser roller 37 functions as the tilted position holding guide as described above. A tubular member (not illustrated) made of urethane is attached to the peripheral face of the presser roller 37. The presser roller 37 is housed in the casing 36 and partially exposed. The casing 36 is fixed to the lower face of the supporting member 40 with the exposed part of the presser roller 37 facing downward. In the present embodiment, three presser members 34 are disposed at regular intervals and fixed to the supporting member 40.

The shaft (the rotation center of the circular plate 6) 24 is present on the extension of the axis of a rotation shaft of each of the presser rollers 37. That is, each of the presser members 34 is fixed to the supporting member 40 with the axis of the presser roller 37 facing the shaft (the rotation center of the circular plate 6) 24. Thus, the axial directions of the respective presser rollers 37 differ from each other. The arrangement direction of the presser rollers 37 intersects the axial direction of each of the presser rollers 37, and the axial directions of the respective presser rollers 37 differ from each other. However, for the convenience of drawing, in FIG. 5, the axis of the presser roller 37 is schematically illustrated as facing a direction perpendicular to the shaft (the rotation center of the circular plate 6) 24. The presser member 34 presses down the upper face of the circular plate 6 (plate body) which constitutes the conveying surface of the curved passage conveyor 3 (described below) along a straight line that is parallel to an introducing side end 3a and a discharging side end 3b of the curved passage conveyor 3 and does not pass through the rotation center of the circular plate 6 (the straight line extending along the supporting member 40 (described below)).

The supporting member 40 and the presser member 34 which have the same configuration as above are provided also in the discharging side linear conveyor 5, and redundant description of the same configuration will be omitted.

As illustrated in FIG. 5, a supporting base 57 is disposed in the space S under the inclined side of each of the inner linear frames 11. As illustrated in FIG. 2, the supporting base 57 is fixed to the connecting members 53, 55 which connect the outer linear frames 10. As illustrated in FIGS. 2, 5 and 6, the supporting base 57 has a substantially triangular shape whose lower side is horizontal and upper side is inclined in side view. The height dimension of the supporting base 57 is high at the side near the curved passage conveyor 3 and becomes lower as separating from the curved passage conveyor 3.

As illustrated in FIG. 5, the supporting base 57 is disposed in the space S. The inclined upper side of the supporting base 57 is parallel to the inclined lower side of the inner linear frame 11. The inclined upper side of the supporting base 57 and the inclined lower side of the inner linear frame 11 are separated from each other by a certain interval in the height direction. That is, a clearance T of the certain interval is formed between the inclined lower side of the inner linear frame 11 and the inclined upper side of the supporting base 57.

Supporting members 60 each of which has the same structure as the supporting member 40 are disposed parallel to the supporting members 40 directly under the respective supporting members 40. Both ends of each of the supporting members 60 are fixed to the outer linear frame 10 and the supporting base 57. A receiving member 61 is fixed to the upper face side of the supporting member 60. The receiving member 61 includes a casing 62 and a receiving roller 63. A tubular member (not illustrated) made of urethane is attached to the peripheral face of the receiving roller 63. The receiving roller 63 is housed in the casing 62 and partially exposed. The casing 62 is fixed to the upper face of the supporting member 60 with the exposed part of the receiving roller 63 facing upward. In the present embodiment, three receiving members 61 are arranged at regular intervals and fixed to the supporting member 60.

The shaft (the rotation center of the circular plate 6) 24 is present on the extension of the axis of a rotation shaft of each of the receiving rollers 63. That is, each of the receiving members 61 is fixed to the supporting member 60 with the axis of the receiving roller 63 facing the shaft (the rotation center of the circular plate 6) 24. Thus, the axial directions of the respective receiving rollers 63 differ from each other. The arrangement direction of the receiving rollers 63 intersects the axial direction of each of the receiving rollers 63, and the axial directions of the respective receiving rollers 63 differ from each other. However, for the convenience of drawing, in FIG. 5, the axis of the receiving roller 63 is schematically illustrated as facing a direction perpendicular to the shaft (the rotation center of the circular plate 6) 24. Each of the receiving members 61 is disposed directly under the corresponding presser member 34.

As illustrated in FIGS. 5, 6, 10 and 12, the circular plate 6 can enter a space between each of the presser rollers 37 and the corresponding receiving roller 63.

As illustrated in FIG. 5, a receiving member 42 is fixed to the supporting base 57. The receiving member 42 is disposed at a position that is farther from the curved passage conveyor 3 than the supporting member 60 is.

As illustrated in FIG. 4, the curved passage conveyor 3 includes the introducing side end 3a (object introducing part) and the discharging side end 3b (object discharging part) which face the same direction and conveys the object 50 with a rotation trajectory of approximately 180°. As illustrated in FIG. 2, the curved passage conveyor 3 includes an outer frame 20, an inner frame 21, the circular plate 6 (plate body), the motor-incorporating roller 7 (rotating unit of the plate body), and an idling member 8.

The outer frame 20 is made of, for example, a light-weight C-shaped steel or a channel steel and bent into a circular arc shape of 180° in plan view. The outer frame 20 includes a flange 20a and a web 20b.

A plurality of supporting members 26 are fixed at intervals on the flange 20a. Each of the supporting members 26 supports an outer guide 16 which is curved in a substantially semicircular arc shape along the outer frame 20. The outer guide 16 is a pipe member or a bar member which is bent with the same curvature radius as the outer frame 20. The outer guide 16 is located above the flange 20a of the outer frame 20 and parallel to the outer frame 20. Both ends of the outer guide 16 are continuous with the outer guide 9 of the introducing side linear conveyor 2 and the outer guide 9 of the discharging side linear conveyor 5.

The inner frame 21 is formed of a plate member bent in a circular arc shape of 180°. The curvature radius of the inner frame 21 is smaller than that of the outer frame 20. The outer frame 20 and the inner frame 21 are concentrically disposed, and connected and fixed through a connector (not illustrated).

The shaft (the rotation center of the circular plate 6) 24 which extends in the up-down direction is disposed on the inner side (inner peripheral side) of the inner frame 21. The shaft (the rotation center of the circular plate 6) 24 is disposed on the connecting member 55. A supporting base 30 is attached to the upper end of the shaft 24. The shaft 24 is provided with a bearing 27.

As illustrated in FIG. 1, the supporting base 30 is a member having an elongated plate-like shape in plan view. One end of the plane shape of the supporting base 30 has a semicircular shape.

The supporting base 30 is fixed to the shaft (the rotation center of the circular plate 6) 24 in a horizontal position. More specifically, the central part of the semicircle on one end of the supporting base 30 is adhered to the shaft 24. The other end of the supporting base 30 extends to a position above the inner linear frames 11 of the introducing side linear conveyor 2 and the discharging side linear conveyor 5. The supporting base 30 is supported by a supporting strut 31 (FIG. 5) which rises from the flanges 11*a* of the inner linear frames 11 of the introducing side linear conveyor 2 and the discharging side linear conveyor 5.

The inner guide 19 is fixed to the supporting base 30 through a supporting member 32 (FIG. 1) which is similar to the supporting member 14 described above.

A plurality of guide rollers 28 (five guide rollers 28 in the present embodiment) are disposed at regular intervals on the flange 20*a* of the outer frame 20. Each of the guide rollers 28 includes a wheel with urethane having a large friction coefficient. The axis of a rotation shaft of each of the guide rollers 28 faces the center of the circular arc outer frame 20. Each of the guide rollers 28 projects to the inner side of the outer frame 20.

In the present embodiment, five idling members 8 are disposed at regular intervals between the web 20*b* of the outer frame 20 and the inner frame 21. That is, the five idling members 8 are disposed at positions corresponding to the five guide rollers 28 disposed on the flange 20*a* of the outer frame 20.

The idling members 8 are radially disposed around the inner frame 21. Each of the idling members 8 includes a shaft 48 and a plurality of (four) short rollers 49*a* to 49*d*. Both ends of the shaft 48 are supported by the web 20*b* of the outer frame 20 and the inner frame 21. The short rollers 49*a* to 49*d* are attached at intervals to the shaft 48.

Each of the short rollers 49*a* to 49*d* is a wheel with urethane having a large friction coefficient and rotatable with respect to the shaft 48. In the short rollers 49*a* to 49*d* disposed on the shaft 48, the short roller 49*a* which is closest to the outer frame 20 is disposed directly under the guide roller 28. An outer peripheral edge 6*b* (described below) of the circular plate 6 is held between the short roller 49*a* (holding member) and the guide roller 28 (holding member).

The idling member 8 and the guide roller 28 function as a horizontal position holding guide which holds the region A of the circular plate 6 in a horizontal position.

In the present embodiment, the motor-incorporating roller 7 is disposed between the outer frame 20 and the inner frame 21. The motor-incorporating roller 7 is disposed between two adjacent idling members 8. The motor-incorporating roller 7 has the same configuration as the motor-incorporating roller employed in the conveying roller 12*c* described above. A tubular friction member 29 which is formed of a material having a large friction coefficient such as urethane is attached to a roller body (outer peripheral face) of the motor-incorporating roller 7. The height of the uppermost part of the motor-incorporating roller 7 is equal to the height of the uppermost part of each of the short rollers 49*a* to 49*d* of the idling member 8.

The circular plate 6 (plate body) is formed of an elastically deformable material, for example, stainless steel and bent by being pressed. A hole 6*a* is formed on the central part of the circular plate 6. The center of the circular plate 6 is aligned with the axis of the shaft (the rotation center of the circular plate 6) 24. The diameter of the hole 6*a* is larger than the diameter of the inner frame 21. A thin plate having a different shape such as a hexagon, an octagon, or an ellipse may be employed instead of the circular plate 6. The hole 6*a* of the circular plate 6 enables the circular plate 6 to easily deform by pressing the surface of the circular plate 6.

A rubber sheet 33 is fixed to the edge of the hole 6*a* of the circular plate 6 with a rivet. The circular plate 6 and the rubber sheet 33 may be fixed with a bolt and a nut. However, the rivet is more preferred in view of vibration and workability. A hole 33*a* is formed on the center of the rubber sheet 33, and the shaft 24 is inserted in the hole 33*a*. The rubber sheet 33 is fixed also to the bearing 27. That is, the rubber sheet 33 blocks the hole 6*a*, and couples the circular plate 6 and the bearing 27 to each other.

The radius of the circular plate 6 is slightly smaller than the radius of the inner peripheral side of the outer frame 20. The center (rotation center) of the circular plate 6 (plate body) is aligned or substantially aligned with the curvature center of the outer frame 20 (curved passage part). That is, the circular plate 6 (plate body) planarly rotates around the curvature center of the outer frame 20 (curved passage part) or the vicinity thereof. That circular plate 6 is placed on the short rollers 49*a* to 49*d* of each of the idling members 8 and the motor-incorporating roller 7 (tubular friction member 29). That is, the circular plate 6 is supported by the idling members 8 and the motor-incorporating roller 7. Thus, the circular plate 6 is planarly rotatable.

The guide roller 28 (holding member) which is fixed to the flange 20*a* of the outer frame 20 is disposed directly above the short roller 49*a* (holding member) which is closest to the outer frame 20 in each of the idling members 8. A guide roller 23 (follower roller) is also attached to the flange 20*a* of the outer frame 20 at a position above the motor-incorporating roller 7. Each of the guide rollers 28, 23 is in contact with the upper face of the outer peripheral edge 6*b* of the circular plate 6.

That is, the outer peripheral edge 6*b* of the circular plate 6 is held between each of the guide rollers 28 and the short roller 49*a*, which is closest to the outer frame 20, of the corresponding idling member 8 and also held between the guide roller 23 and the motor-incorporating roller 7. Thus, in the curved passage conveyor 3, the movement in the up-down direction of the circular plate 6 is restricted. In the curved passage conveyor 3, the upper face of the circular plate 6 functions as a conveying surface which conveys the object 50 placed thereon. That is, the conveying surface of the curved passage conveyor 3 is stable without moving up and down. Further, the circular plate 6 is supported by the urethane attached parts of the guide rollers 28, the short rollers 49*a*, and the motor-incorporating roller 7. Thus, wearing and local deformation of the circular plate 6 can be prevented.

The circular plate 6 is fixed to the bearing 27 (outer race) which is attached to the shaft 24 through the rubber sheet 33 and rotatable around the shaft 24. The region A (FIG. 4) which occupies substantially half the circular plate 6 is located in the curved passage conveyor 3 and exposed to constitute the conveying surface.

The region B (FIG. 4) which occupies the rest part of the circular plate 6 is housed under the introducing side linear conveyor 2 and the discharging side linear conveyor 5. Specifically, as illustrated in FIG. 5, the region B of the circular plate 6 enters the clearance T which is an inclined space between the lower inclined surface of the inner linear frame 11 and the upper inclined surface of the supporting base 57.

The presser members 34 and the receiving members 61 are disposed between the conveying rollers 12*e*, 12*f* of the introducing side linear conveyor 2 and the discharging side linear conveyor 5. The presser members 34 are disposed below the conveying surface D.

The upper face (region B) of the circular plate 6 enters the clearance T and is pressed by the presser roller 39 of the presser member 35 and the presser rollers 37 of the respective presser members 34 which are arranged on a straight line extending along the supporting member 40. The lower face of the circular plate 6 is supported by the receiving rollers 63 of the respective receiving members 61 which are arranged on a straight line extending along the supporting member 60. That is, the region B of the circular plate 6 is pressed by the presser roller 39 and the presser rollers 37 along a straight line that does not pass through the rotation center of the circular plate 6 (the straight line extending along the supporting member 40). Thus, as illustrated in FIG. 5, the circular plate 6 pressed by the presser members 34, 35 is curved or bent toward a position under the conveying rollers 12a to 12f of the introducing side linear conveyor 2 and the discharging side linear conveyor 5.

The axis of the presser roller 37 of each of the presser members 34 and the axis of the receiving roller 63 of each of the receiving members 61 face the shaft 24 which is located on the rotation center of the circular plate 6. Thus, each of the presser rollers 37 and each of the receiving rollers 63 rotate following the rotation of the circular plate 6. The presser roller 39 also rotates following the circular plate 6. The presser roller 39 is a taper roller, and the circular plate 6 easily follows the inclination of the presser roller 39. That is, the circular plate 6 smoothly rotates by being pressed by the presser rollers 37, 39 in the region B from the upper side.

Specifically, as illustrated in FIG. 5, the height of the lowermost part of the presser roller 39 and the height of the lowermost part of each of the presser rollers 37 are lower than the height of the lowermost part of the conveying roller 12f which is closest to the curved passage conveyor 3 in the conveying rollers 12. At the side corresponding to the curved passage conveyor 3 (region A), the height position of the circular plate 6 is fixed by each of the guide rollers 28 and the corresponding short roller 49a (holding member). Further, the presser roller 39 and each of the presser rollers 37 press the circular plate 6, so that the circular plate 6 is curved or bent without making contact with the conveying rollers 12a to 12f. The hole 6a is formed on the central part of the circular plate 6, and the rubber sheet 33 which is easily deformable is attached to the hole 6a. Thus, when the presser roller 39 and each of the presser rollers 37 press the circular plate 6, the circular plate 6 is easily curved or bent around the hole 6a.

The receiving rollers 63 of the receiving members 61 which are disposed below the presser members 34 are in contact with the lower face of the circular plate 6 to support the circular plate 6. The circular plate 6 is also supported by the receiving member 42 (FIG. 3). The receiving member 42 includes a receiving roller 43 which supports the circular plate 6. Thus, the circular plate 6 is prevented from being bent by its own weight.

The circular plate 6 is supported at different height positions between the side corresponding to the curved passage conveyor 3 (region A) and the side corresponding to the introducing side linear conveyor 2 and the discharging side linear conveyor 5 (region B). Thus, the circular plate 6 is curved or bent between the region A and the region B. The circular plate 6 is a thin plate having a thickness of approximately 0.3 to 0.8 mm and formed of an elastic material (e.g., stainless steel). Thus, the circular plate 6 immediately returns to its original flat plate shape when the pressing is released.

The circular plate 6 rotates by driving the motor-incorporating roller 7. At this time, in the circular plate 6, a part passing through the vicinity of the boundary between the curved passage conveyor 3 and the introducing side linear conveyor 2 (near the boundary line X-X) and a part passing through the vicinity of the boundary between the curved passage conveyor 3 and the discharging side linear conveyor 5 are sequentially curved or bent. Then, in the circular plate 6, the curved or bent part between the curved passage conveyor 3 and the introducing side linear conveyor 2 rotationally moves toward the curved passage conveyor 3 (region A) and returns to a horizontal state to constitute the conveying surface.

In the vicinity of the boundary between the discharging side linear conveyor 5 and the curved passage conveyor 3 (near the boundary line X-X), a part of the circular plate 6 constituting the conveying surface on the curved passage conveyor 3 is curved or bent and further rotationally moves, in a tilted position with respect to the horizontal plane, toward the position under the conveying rollers 12 of the discharging side linear conveyor 5. That is, when the circular plate 6 rotates, the parts of the circular plate 6 are sequentially exposed on the curved passage conveyor 3 (region A) to constitute the conveying surface of the curved passage conveyor 3, or curved or bent and moves, in a tilted position with respect to the horizontal plane, under the conveying rollers 12 of the discharging side linear conveyor 5 and the introducing side linear conveyor 2 (region B). Further, the part tilted with respect to the horizontal plane of the circular plate 6 in the region B returns to the horizontal position to serve as the conveying surface of the curved passage conveyor 3 (region A).

In the conveyor device 1 of the present embodiment, the introducing side linear conveyor 2 and the discharging side linear conveyor 5 are disposed on the respective ends of the curved passage conveyor 3 located on the center. The curved passage conveyor 3 includes a curved passage of approximately 180°, and the introducing side end 3a and the discharging side end 3b face substantially the same direction. Thus, the introducing side linear conveyor 2 and the discharging side linear conveyor 5 are disposed parallel to each other. The interval W1 between the introducing side linear conveyor 2 and the discharging side linear conveyor 5 is small, and 10% or less of the width W of the introducing side linear conveyor 2 and the discharging side linear conveyor 5.

For example, when the width of the introducing side linear conveyor 2 and the discharging side linear conveyor 5 is 500 mm to 1000 mm, the interval between the introducing side linear conveyor 2 and the discharging side linear conveyor 5 can be set to approximately 50 mm. According to the present invention, the interval can be set to at least 20% or less of the width of the introducing side linear conveyor 2 and the discharging side linear conveyor 5.

Next, the function of the conveyor device 1 of the present embodiment will be described.

Figure 7:
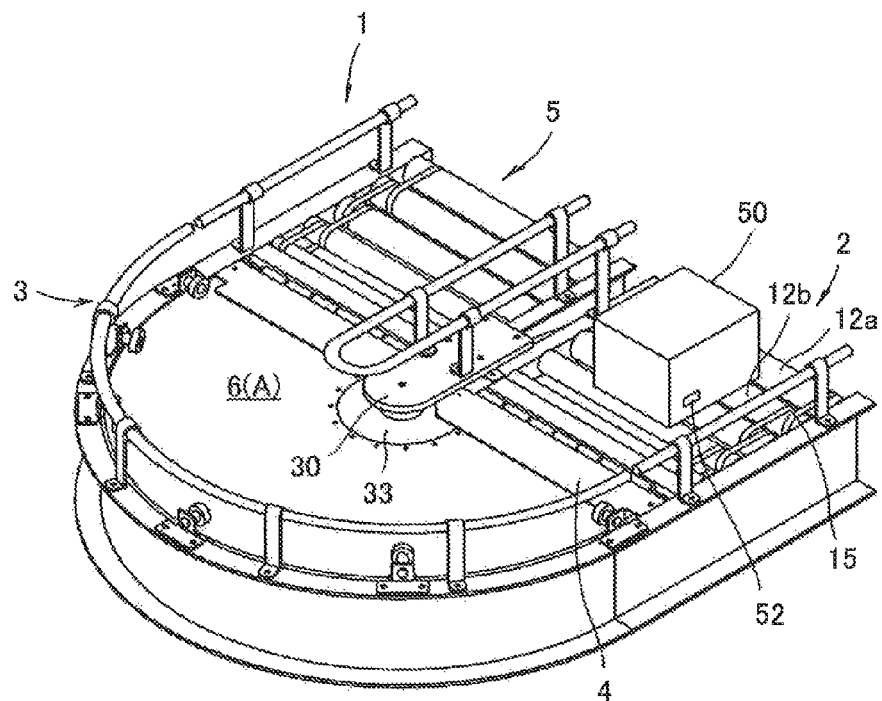
FIG. 7 is a perspective view describing a state when the conveyor device of FIG. 1 conveys an object and illustrating a state in which an introducing side linear conveyor is conveying the object.

The conveyor device 1 of the present embodiment carries in the object 50 through the introducing side linear conveyor 2, as illustrated in FIG. 7, changes the direction of the object 50 by 180° by the curved passage conveyor 3, and sends out the object 50 through the discharging side linear conveyor 5. For example, the object 50 having a width close to the width W of the introducing side linear conveyor 2 is carried in through the introducing side linear conveyor 2. Then, the object 50 is conveyed by the conveying rollers 12a to 12f of the introducing side linear conveyor 2, slides on the shielding plate 4 on the end, and is transferred to the curved passage conveyor 3 (the exposed rotation region of the circular plate 6). That is, the conveying surface D of the introducing side linear conveyor 2 and the shielding plate 4 have substantially the same height, and the object 50 thus smoothly passes on the shielding plate 4 from the conveying rollers 12a to 12f and further moves onto the circular plate 6 of the curved passage conveyor 3. On the other hand, a part of the circular plate 6 on which the object 50 was placed gets under the shielding plate 4 and the conveying rollers 12 of the discharging side linear conveyor 5. That is, the part of the rotation region (region B) of the circular plate 6 other than the curved passage conveyor 3 (region A) is shielded by the conveying rollers 12.

Figure 8:
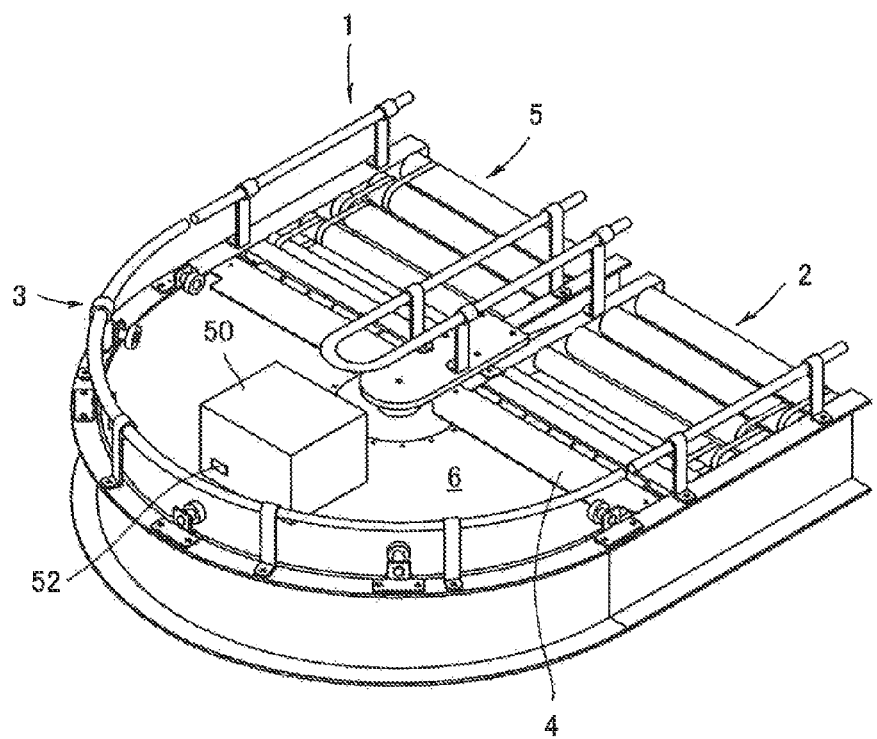
FIG. 8 is a perspective view describing a state when the conveyor device of FIG. 1 conveys an object and illustrating a state in which a curved passage conveyor is conveying the object.
Figure 9:
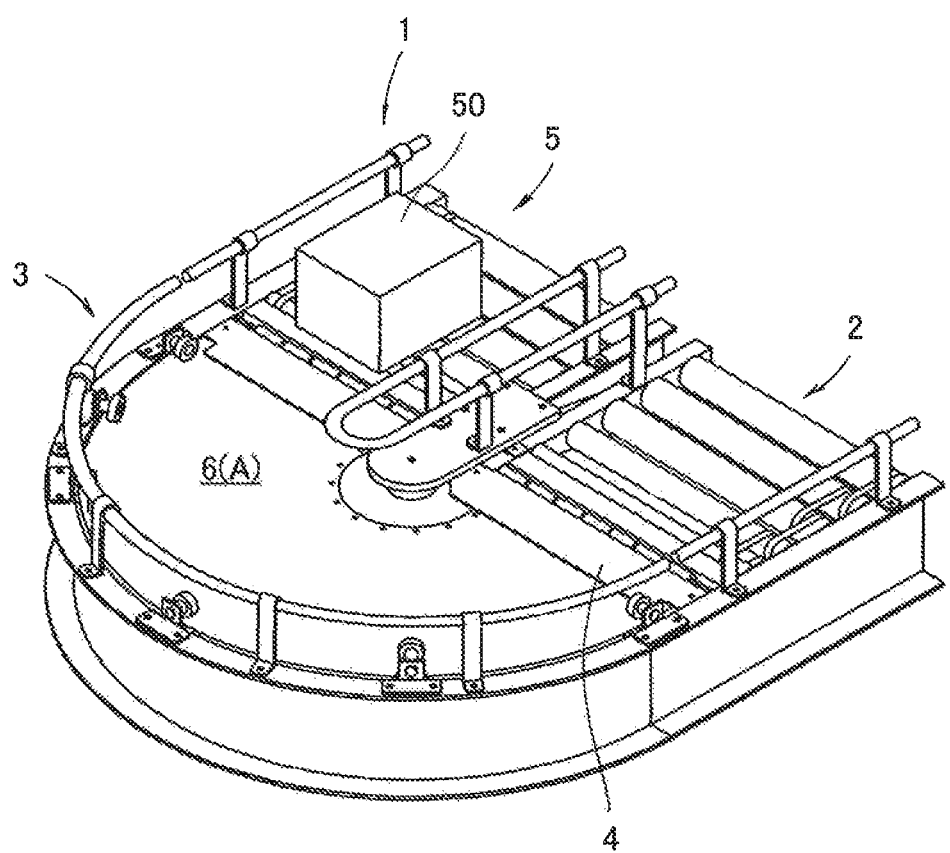
FIG. 9 is a perspective view describing a state when the conveyor device of FIG. 1 conveys an object and illustrating a state in which a discharging side linear conveyor is conveying the object.

Then, as illustrated in FIG. 8, the object 50 is placed on the conveying surface (circular plate 6) of the curved passage conveyor 3 and conveyed, changed in its conveying direction by 180°, and discharged to the discharging side linear conveyor 5 as illustrated in FIG. 9. The circular plate 6 continuously rotates, and moves toward the curved passage conveyor 3 through the position under the conveying rollers 12 of the introducing side linear conveyor 2 and the shielding plate 4 so as to be exposed. Then, the circular plate 6 conveys the subsequent object conveyed from the introducing side linear conveyor 2 to the discharging side linear conveyor 5.

When the object 50 moves from the introducing side linear conveyor 2 to the discharging side linear conveyor 5 through the curved passage conveyor 3 (circular plate 6), the front-rear direction of the object 50 with respect to the conveying direction does not change. This is convenient when an information recording unit such as a bar code 52 is attached to a predetermined position (e.g., a left side face) of the object 50, a plurality of sensors (not illustrated) are disposed at a plurality of positions on the midway of the conveying passage, and information about a conveyance destination and contents relating to the object 50 is read by each of the sensors.

Further, the upper face of the circular plate 6 (plate body) serves as the conveying surface of the curved passage conveyor 3. Thus, vibrations transmitted to the object 50 are reduced compared to a roller conveyor. Further, since the circular plate 6 (plate body) is employed, understeer is less likely to occur and the object 50 is less likely to rub against the outer guide 16 when the object 50 changes its course. That is, the object 50 is smoothly conveyed, which prevents the object 50 from being caught by the outer guide 16 on the curved passage conveyor 3 and changing its direction into an oblique direction or being stagnated on the curved passage conveyor 3.

As illustrated in FIG. 1, the conveyor device 1 of the present embodiment enables the introducing side linear conveyor 2 and the discharging side linear conveyor 5 to be disposed close to each other. Thus, no wasted space is formed between the introducing side linear conveyor 2 and the discharging side linear conveyor 5. That is, the conveyor device 1 can be downsized, and space saving can be achieved.

Thus, the conveyor device 1 of the present embodiment enables the floor surface to be effectively used.

The introducing side linear conveyor 2 and the discharging side linear conveyor 5 may use a traveling body such as a belt conveyor.

In the conveyor device 1 of the present embodiment, the curved passage conveyor 3 includes a curved passage of 180°, and the introducing side end 3a and the discharging side end 3b face the same direction. However, the curved passage conveyor 3 is not limited to such a form. For example, the introducing end 3a and the discharging side end 3b face perpendicular directions. That is, the curved passage may be formed at any angle equal to or less than 180°.

EXPLANATION OF REFERENCE SIGNS

1: Conveyor device
2: Introducing side linear conveyor (other member)
3: Curved passage conveyor (curved passage part)
3a: Introducing side end (object introducing part)
3b: Discharging side end (object discharging part)
5: Discharging side linear conveyor (other member)
6: Circular plate (plate body)
7: Motor-incorporating roller (rotating unit of plate body)
12a to 12f: Conveying roller
23: Guide roller (follower roller)
28: Guide roller (holding member)
34: Presser member (pressing member)
49a: Short roller (holding member)
50: Object

The invention claimed is:

1. A conveyor device comprising:
a circular plate body made from thin metal and defining, a curved passage part with a curvature center;
an object introducing part that introduces an object into the curved passage part;
an object discharging part that discharges the object from the curved passage part;
the circular plate body planarly rotating around the curvature center of the curved passage part or the vicinity of the curvature center; and
a rotating unit for rotating the circular plate body,
the rotating unit transmitting rotational power to the circular plate body location spaced from the curvature center,
wherein a surface of the plate body is exposed in a rotation region from the object introducing part to the object discharging part, and
wherein the surface of the circular plate body is curved or bent downward to get under a different member in a rotation region from the object discharging part through the object introducing part.

2. The conveyor device according to claim 1,
wherein a part of the circular plate body located at a position other than the curved passage part is shielded by a different member, the circular plate body being elastically deformable, and
wherein a part shielded by the different member is tilted with respect to a part located in the curved passage part and gets under the different member.

3. The conveyor device according to claim 1, further comprising a pressing member that presses the circular plate body along a straight line parallel to the object introducing part and/or the object discharging part, the straight line not passing through a rotational center of the plate body.

4. The conveyor device according to claim 1, wherein the curved passage part comprises a plurality of holding members that hold a front face or a rear face of the circular plate body and that are disposed at a plurality of positions.

5. The conveyor device according to claim 1, wherein each of the object introducing part and the object discharging part is provided with a linear conveyor, the two linear conveyors being parallel to each other, each of the linear conveyors conveying the object by a rotation body or a traveling body.

6. The conveyor device according to claim 1, wherein both ends of the curved passage part face substantially the same direction.

7. The conveyor device according to claim 5, wherein an interval between the linear conveyors is 20% or less of a width of each of the linear conveyors.

8. The conveyor device according to claim 1, further comprising a motor-incorporating roller and a follower roller that hold a front face or a rear face of the circular plate body.

9. The conveyor device according to claim 1, further comprising a tilted position holding guide that presses at least a front face of the circular plate body to force a part of the circular plate body in a tilted position.

10. The conveyor device according to claim 1, further comprising a horizontal position holding guide that holds a front face or a rear face of the circular plate body to hold a part of the circular plate body in a substantially horizontal position.

11. The conveyor device according to claim 9, wherein the tilted position holding guide includes a freely-rotatable roller.

12. The conveyor device according to claim 1, further comprising a load supporting member that is disposed on a rear face of the circular plate body in a region constituting the curved passage part, the load supporting member supporting the rear face of the circular plate body to indirectly support weight of the object placed on the circular plate body.

13. The conveyor device according to claim 1, wherein a front face side of the circular plate body is supported not to rise up in a rotation region from the object introducing part to the object discharging part.

14. A conveyor device comprising:
a circular plate body made from thin metal and defining, a curved passage part with a curvature center; and
a rotating unit for rotating the circular plate body,
the rotating unit transmitting rotational power to the circular plate body at a location spaced from a rotational center of the circular plate body,
wherein a part of the circular plate body is located in the curved passage part to constitute a conveying surface of the curved passage part,
wherein another part of the plate body located at a position other than the curved passage part is curved or bent downward to be shielded by a different member, and
wherein the curved passage part comprises:
an object introducing part where the rotating plate body appears in the curved passage part from a position shielded by the different member; and
an object discharging part where the rotating circular plate body is housed into the position shielded by the different member from the curved passage part.

15. The conveyor device according to claim 14, wherein a front face side of the circular plate body is supported not to rise up in the curved passage part.

16. The conveyor device according to claim 14, further comprising a pressing member that presses the circular plate body along a straight line parallel to the object introducing part and/or the object discharging part, the straight line not passing through the rotational center of the circular plate body.

17. The conveyor device according to claim 14, wherein the curved passage part comprises a plurality of holding members that hold a front face or a rear face of the circular plate body and that are disposed at a plurality of positions.

18. The conveyor device according to claim 14, further comprising a tilted position holding guide that presses at least a front face of the circular plate body to force a part of the circular plate body in a tilted position.

19. The conveyor device according to claim 14, further comprising a horizontal position holding guide that holds a front face or a rear face of the circular plate body to hold a part of the circular plate body in a substantially horizontal position.

20. A conveyor device comprising:
a circular plate body made from thin metal and defining a curved passage part with a curvature center;
an object introducing part that introduces an object into the curved passage part;
an object discharging part that discharges the object from the curved passage part;
the circular plate body planarly rotating around the curvature center of the curved passage part or the vicinity of the curvature center;
a rotating unit for rotating the circular plate body,
the rotating unit transmitting rotational power to the circular plate body at a location spaced from the curvature center,
a tilted position holding guide that presses at least a front face of the circular plate body to force a part of the circular plate body in a tilted position; and
a horizontal position holding guide that holds a front face or a rear face of the circular plate body to hold a part of the circular plate body in a substantially horizontal position,
wherein a surface of the circular plate body is exposed in a rotation region from the object introducing part to the object discharging part, and
wherein the surface of the circular plate body is curved or bent downward to get under a different member in a rotation region from the object discharging part through the object introducing part.

* * * * *